May 31, 1927.

S. NISHIDA

GOVERNOR FOR PHONOGRAPHS

Filed Sept. 8, 1925   2 Sheets-Sheet 1

1,630,630

INVENTOR.
S. Nishida
BY Marks & Clerk
ATTORNEY.

May 31, 1927. 1,630,630
S. NISHIDA
GOVERNOR FOR PHONOGRAPHS
Filed Sept. 8, 1925 2 Sheets-Sheet 2

INVENTOR.
S. Nishida
BY
Marks & Clerk
ATTORNEY.

Patented May 31, 1927.

1,630,630

UNITED STATES PATENT OFFICE.

SUKEJIRO NISHIDA, OF OSAKA-FU, JAPAN.

GOVERNOR FOR PHONOGRAPHS.

Application filed September 8, 1925, Serial No. 55,123, and in Japan September 19, 1924.

My invention relates to phonograph governors and more particularly to controlling devices of governors for disc type phonographs.

An object of my invention is to obtain a governor of the class specified which is adaptable for phonographs of either kind having a rotatable disc of constant angular speed or of constant linear speed at the point registering with the needle tip.

Another object of my invention is to provide means whereby the retarding effect of the governor is varied in accordance with the rotation of sound recorder disc so as to have the disc rotating at either a predetermined constant angular speed or a predetermined constant linear speed at the point registering with the needle tip.

Another object of my invention is to obtain means adapted to continually vary the revolution of governor weights in accordance with the rotation of sound recorder disc.

Another object of my invention is to provide means whereby the rotating speed of recorder disc may be predetermined desirably.

A further object of my invention is to obtain a governor which is readily applicable to any phonographic machine of the disc type, with no need of substantial changes or modification of its construction.

A still further object of my invention is to obtain a governor which is simple in construction, economical in manufacture and reliable in operation.

Other objects and particularities of my invention are fully and completely disclosed in the following description with reference to the accompanying drawings wherein.

Figure 1:
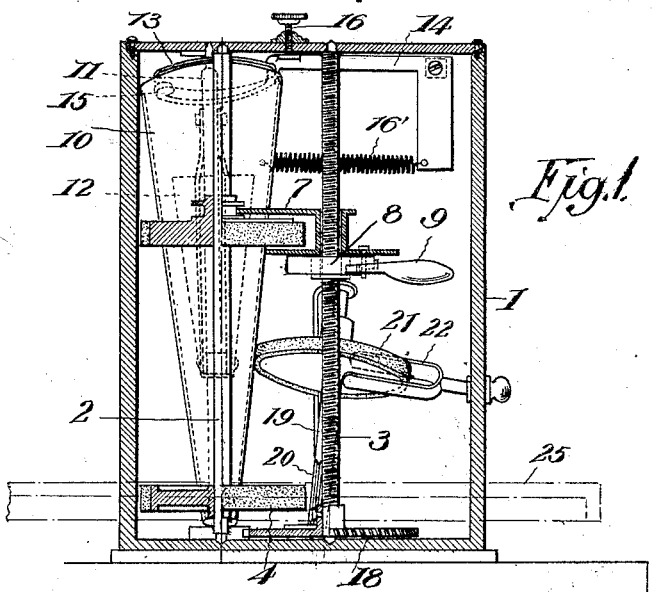
Fig. 1 is a front elevation of a governor embodying my invention, partly in section showing the arrangement thereof with respect to the record supporter disc of a phonographic machine.
Figure 2:
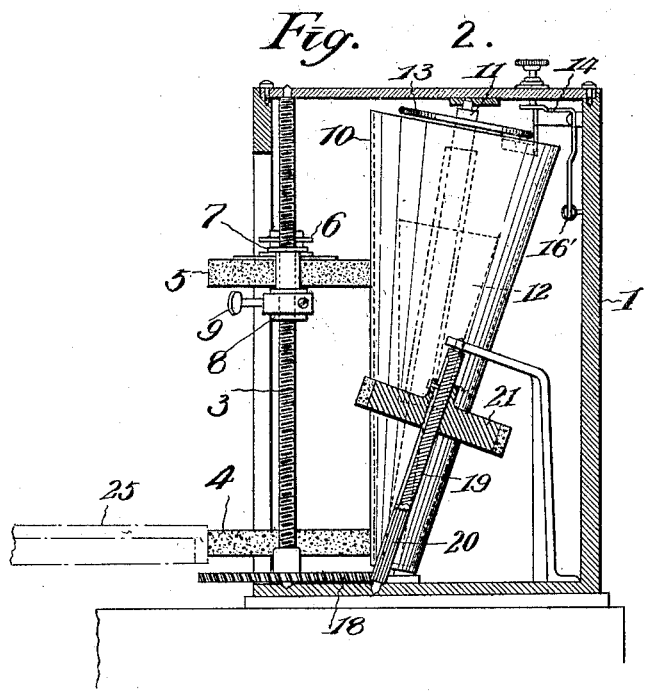
Fig. 2 is a side elevation of same partly in section.
Figure 3:
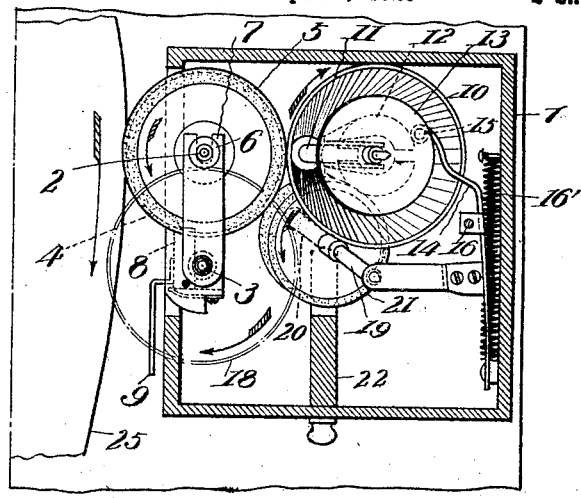
Fig. 3 is a plan of same partly in section.
Figure 4:
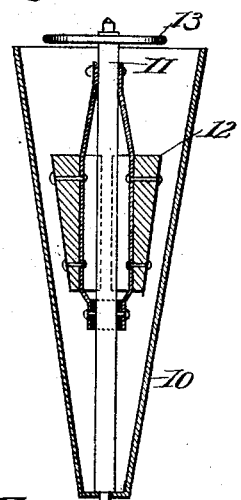
Fig. 4 is a longitudinal sectional view of a conical member.
Figure 6:
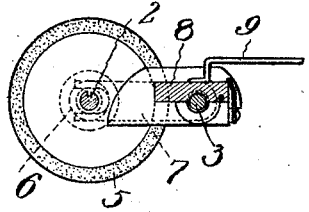
Fig. 6 is a plan of a wheel slidably mounted on a shaft.
Figure 5:
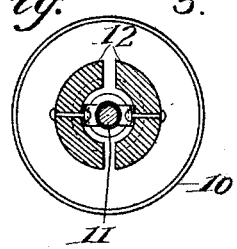
Fig. 5 is a plan of same partly in section.

Referring now to the drawings, my governor comprises a casing 1 having therein a vertically disposed shaft 2 a rotatable threaded rod 3 arranged in parallel to the shaft 2, and a conical member 10 mounted on an inclined shaft 11 and having a side line parallel to the shaft 2.

The shaft 2 is rotatable between suitable bearings with respect to the casing 1 and has a wheel 4 fixed thereto and another wheel 5 slidably mounted thereon but rotatable therewith. The wheel 5 is provided with a hub portion 6 adapted to engage with a forked member 7 which is an extension of a nut member 8 cooperating with the threaded rod 3. The member 8 may have any convenient well-known construction, and for example, may comprise a plurality of portions adapted to be joined into one by means of clipping means 9, and may be easily mounted or demounted on the rod 3. The means 9 also serves to prevent the rotation of the nut 8 by cooperation with a stationary portion in the casing 1. The wheel 4 is arranged to frictionally contact with the supporter disc 25 at its periphery while the wheel 5 makes a frictional contact with the conical member 10 at its side parallel to the shaft 2.

The conical member 10 encloses therein a set of governor elements 12 of the well known centrifugal type mounted on its shaft 11, and revolves synchronously with the governor elements. The governor elements carry as usual a disc 13 slidably along the shaft 11 and cooperating with a frictional retarding element 15. The element 15 is carried by a lever 14 at one leg end thereof. The lever is of substantially an L-shape and pivotally mounted on the casing 1 at its corner, having its other leg end subjected to a tension spring 16' so as to have the frictional retarding element 15 pressing on the face of the disc 13. The disposition of the element 15 with respect to the disc 13 may be adjusted by means of a screw 16 cooperating with a threaded portion in the casing 1.

An inclined short shaft 19 is also rotatably disposed within the casing 1 between a point in the wall of casing and the end of a suitable stud arranged within the casing. The shaft 19 has a wheel 21 slidably mounted thereon but rotatable with the shaft 19 and adapted to make a frictional contact with the conic surface 10 at its periphery.

The shaft 19 also has a pinion 20 fixed thereto and adapted to engage with a toothed wheel 18 mounted on the threaded rod 3. The wheel 21 is adjusted along the shaft 19 by means of a forked member 22 slidably engaging the wheel and adapted to be actuated manually through a handle portion thereof extending outside of the casing through a long opening therein. A scale may be produced on the casing along the opening so that the position of the wheel 21 with respect to the conical surface 10 may be readily inspected. Regardless of the position of the wheel 21 with respect to the conical surface 10, they always make a frictional contact with each other, because the shaft 19 is arranged parallel to a side line of the conical member, on which line the wheel 21 makes its peripheral contact.

In operation, the wheels 5 and 21 are adjusted respectively with regard to the conical surface 10. The adjustment of the wheel 5 may be effected by adjusting the position of the nut member 8 by means of the clipping member 9 which serves also as a handle portion and may be extended outside of the casing 1 through a long opening along which a suitable scale may be produced for an easy and accurate adjusting as in the case for the handle member 22.

In accordance with the rotation of the disc 25, the shaft 2 rotates and the conic member 10 together with the governor elements 12 are driven by the wheel 5. The conic member in turn drives the wheel 21, and the threaded rod is also driven by means of the pinion 20 and the toothed wheel 18. Then, the nut member 8 travels along the rod 3 at a rate predetermined by the positions of wheels 5 and 21 with respect to the corresponding side line of the conical surface 10. The governor elements 12 operate to retard the revolution of the disc 25 by means of the disc 13 and the friction element 15. As the wheel 5 travels towards the end of the conical member having the largest diameter, in accordance with the rotation of the disc 25, the rotating angular speed of the conical member and consequently of the governor elements 12 decreases and its retarding effect consequently decreases gradually. Then the result is a gradual increase of the angular speed of the disc 25, which increase assures of a constant linear speed of same at the point registering with the needle tip travelling radially inwardly along the disc surface, as the rate of said increase is properly chosen.

When it is desired that a constant angular speed of the disc 25 may be obtained, a mere detachment of the wheel 21 out of the contact with the conical surface 10 will be satisfactory. The rod 3 is not rotated and consequently the wheel 5 does not vary its position with respect to the conical surface. It is obvious that a constant angular speed of the governor elements 12 and the disc 25 is thus obtained.

Though I have illustrated only one embodiment of my invention, it will be obvious to those skilled in the art that various changes and modifications may be made without departing from the scope and spirit of the invention.

Having now particularly described and ascertained the nature of my said invention and in what manner the same is to be performed, I declare that what I claim is:—

1. In a governor for disc type phonograph, comprising a wheel adapted for engaging with the disc of said phonograph at its periphery, a rotatable shaft therefor, a second wheel slidably mounted on said shaft and rotatable with the same, a rotatable threaded rod disposed in parallel with said shaft, a nut member locked of its rotation but adapted to travel as the rod rotates and associated with said second wheel, a rotatable conical body having a side line parallel to said shaft along which side line said second wheel engages frictionally, governor elements associated with said body for retarding the rotation of said disc, and means for transmitting the rotation of said body to said threaded rod.

2. In a governor for disc type phonograph, comprising a wheel adapted for frictionally engaging with the disc of said phonograph, a rotatable shaft therefor, a second wheel slidably mounted on said shaft and rotatable with the same, a rotatable threaded rod disposed in parallel with said shaft, a nut member locked of its rotation but adapted to travel along the rod as the latter rotates and associated with said second wheel, a rotatable body having a conical surface in frictional contact with said second wheel at a side line parallel to said shaft and governor elements of centrifugal type enclosed therein with a frictional means for retarding the rotation of said body, a second shaft disposed in parallel to another side line of said conical surface, a third wheel mounted thereon in frictional contact with said conical surface at said second side line and a pair of gear wheels for transmitting the rotation of said second shaft to said threaded rod.

3. In a governor as set forth in the foregoing claim, a combination of said governor with means for adjusting the positions of said second and third wheels along the respective shafts.

In testimony whereof I affix my signature.

SUKEJIRO NISHIDA.